United States Patent [19]

Calvignac et al.

[11] Patent Number: 5,629,928
[45] Date of Patent: May 13, 1997

[54] DYNAMIC FAIR QUEUING TO SUPPORT BEST EFFORT TRAFFIC IN AN ATM NETWORK

[75] Inventors: Jean Calvignac, La Gaude; Daniel Orsatti, Cagnes sur Mci; Fabrice Verplanken, La Gaude, all of France

[73] Assignee: International Business Machines Corporation, Armonk, N.Y.

[21] Appl. No.: 570,840

[22] Filed: Dec. 12, 1995

[30] Foreign Application Priority Data

Dec. 13, 1994 [EP] European Pat. Off. ............ 94480170

[51] Int. Cl.$^6$ .................................................. H04L 12/56
[52] U.S. Cl. ........................... 370/237; 370/397; 370/412
[58] Field of Search ................................. 370/13, 17, 60, 370/61, 60.1, 94.2, 85.6, 85.7, 84, 94.1; 340/825.5, 825.51; 395/650, 849

[56] References Cited

U.S. PATENT DOCUMENTS

| | | | |
|---|---|---|---|
| 5,150,358 | 9/1992 | Punj et al. | 370/61 |
| 5,231,633 | 7/1993 | Hluchyj | 370/60 |
| 5,268,900 | 12/1993 | Hluchyj et al. | 370/85.6 |
| 5,436,891 | 7/1995 | Grossman et al. | 370/94.3 |
| 5,499,238 | 3/1996 | Shon | 370/60.1 |
| 5,515,363 | 5/1996 | Ben-Nun et al. | 370/85.6 |
| 5,533,009 | 7/1996 | Chen | 370/17 |
| 5,533,020 | 7/1996 | Byrn et al. | 370/60.1 |

FOREIGN PATENT DOCUMENTS

| | | |
|---|---|---|
| 0272939 | 6/1988 | European Pat. Off. . |
| 0430570 | 6/1991 | European Pat. Off. . |

OTHER PUBLICATIONS

Business Communications Review vol. 24, No. 9 USA pp. 78–82 D. Hunt "ATM Traffic Management—Another Perspective", Sep. 1994.

Globecom '90 vol. 1, Dec. 1990 USA pp. 12–20, C.R. Kalmanek et al "Rate Controlled Servers for Very High-Speed Networks" Line 1—p. 16.

International Teletraffic Congress, Amsterdam, NL pp. 153–159 "Memory, Bandwidth, Processing and Fairness Considerations in Real Time Congestion Controls for Broadband Networks", 1991.

*Primary Examiner*—Douglas W. Olms
*Assistant Examiner*—Chau T. Nguyen
*Attorney, Agent, or Firm*—Gerald R. Woods

[57] ABSTRACT

A flow control apparatus implemented in a virtual path ATM communication system comprising a plurality of nodes interconnected by physical links which comprise virtual paths including a plurality of virtual channels. A connection between two nodes is defined as the combination of a physical link, a virtual path, and a virtual channel. Connections are shared between a reserved bandwidth service and a best effort service. ATM data cells conveyed on said best effort service are routed from node to node by analyzing their virtual connection identifier. Queues, allocated as needed from a pool of free queues, are used to store all incoming ATM data cells having the same virtual channel identifier.

8 Claims, 9 Drawing Sheets

FIG. 1

PRIOR ART

FIG. 2

PRIOR ART

FIG. 3

PRIOR ART

DYNAMIC FAIR QUEUING TO SUPPORT BEST EFFORT TRAFFIC IN AN ATM NETWORK

FIELD OF THE INVENTION

This invention relates in general to data communications and more particularly to a dynamic connection-based queuing mechanism for supporting best effort traffic service in a high speed ATM (Asynchronous Transfer Mode) data communication network.

BACKGROUND ART

Asynchronous Transfer Mode (ATM) technology is expected to be the base technology for the next generation of high speed data networks. High speed networks must support diverse applications with different traffic and Quality Of Service (QOS) requirements. Different kinds of applications require different control flow strategies. Some applications, such as multimedia and time critical data applications, require guaranteed limits on transmission delays and guaranteed throughput but can tolerate some loss of data. Other applications can tolerate variations in delay and throughput but are very loss sensitive.

Figure 1:
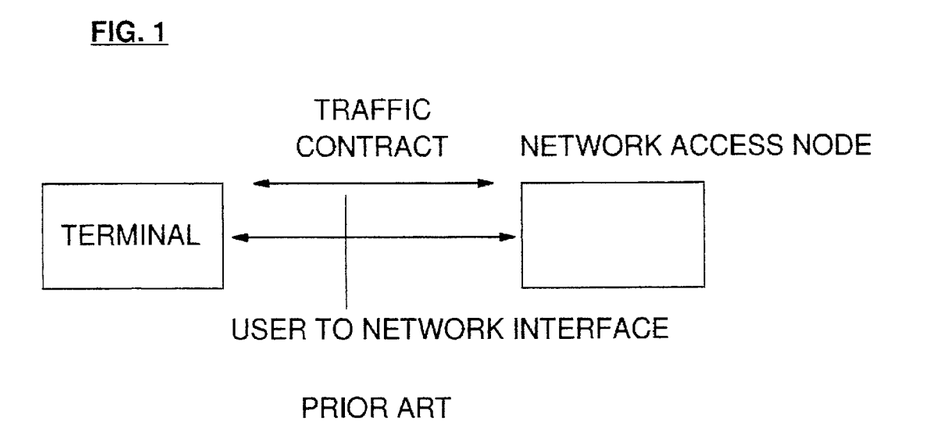
FIG. 1 is a diagram of conventional Reserved Bandwidth service.

In ATM Reserved Bandwidth (RB) service, a user must establish a traffic contract with the network at call set-up before transmitting data (see FIG. 1). The contract includes specification of a desired QOS class and a set of traffic descriptors. The network can either refuse the call or, by allocating bandwidth to the call, provide the desired QOS for the ATM connection. The bandwidth actually allocated may be less than the anticipated peak bandwidth in order to benefit from statistical multiplexing gains. More specifically, since multiple connections are multiplexed onto a single link, it is statistically improbable that all connections will need their peak bandwidth at a the same time. Therefore, at a given time, a connection requiring high bandwidth, can "borrow" bandwidth allocated to but not actually being used by other connections.

In a LAN environment, data sources are bursty and unpredictable. Traffic rates, over time, can vary by several orders of magnitude. For such unpredictable sources, the anticipated peak bandwidth could be allocated at call setup in order to avoid heavy data losses as a result of congestion inside the network. However, the network would be inefficiently used since bandwidth reserved for a particular connection could not be made available to other connections regardless of whether it was needed by the reserving connection.

Figure 2:
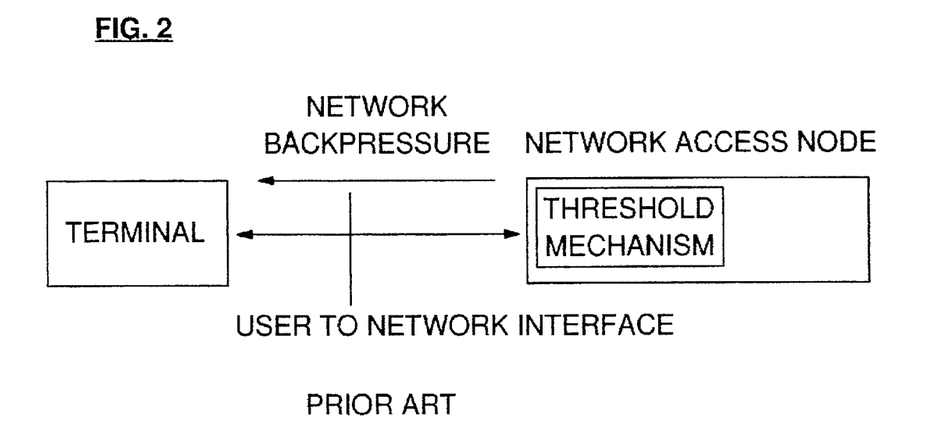
FIG. 2 is a diagram of conventional NonReserved Bandwidth or Best Effort service.

One way to increase network link utilization is through the addition of a Non Reserved Bandwidth (NRB) service class, also called Best Effort (BE) service (see FIG. 2). In this service class, bandwidth is not reserved and a source transmits on a best effort basis, grabbing as much of the available bandwidth. Available bandwidth excludes any bandwidth already allocated for RB traffic being carried on the same link. In the absence of advance allocations of bandwidth, NRB service requires a flow control mechanism in order to avoid congestion in the network. The first objective of such a flow control mechanism is to avoid congestion in the network; the second objective is to balance the available bandwidth among different competing sources.

The use of backpressure signals to provide flow control has been extensively studied and is widely implemented. The objective of backpressure flow control is to stop incoming traffic at a congested node of the network before data is lost as a consequence of the congestion. Backpressure signals generated at a particular node can be sent to upstream nodes to stop or restart data traffic on connections from the upstream node to the signal-generating node. In this scheme, every source is supposed to be able to stop or restart its NRB traffic when receiving an appropriate backpressure signal.

Figure 3:
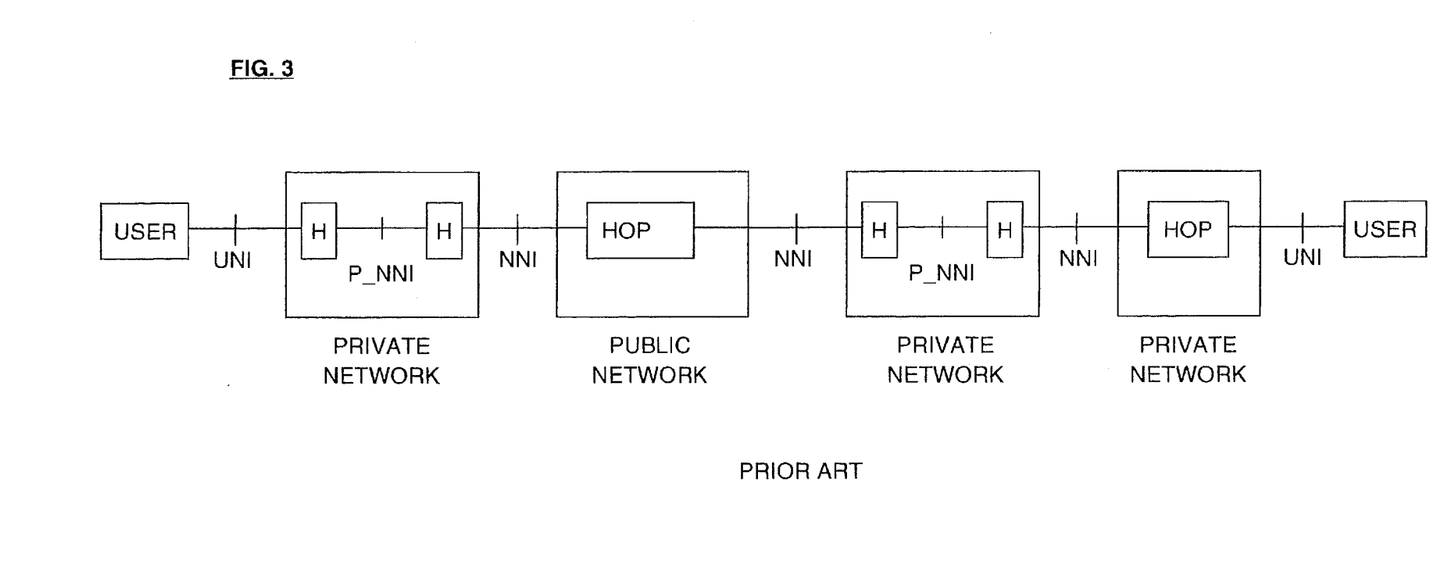
FIG. 3 is a diagram of a network comprising a plurality of nodes and links.

One such flow control scheme is described in the co-pending U.S. patent application Ser. No. 08/554,113 filed on Nov. 6, 1995. This scheme is a hop by hop backpressure mechanism. The term "hop" is well known in the prior art (see FIG. 3) and can be defined as a standard interface between any two nodes or systems. Examples of standard interfaces are: User to Network Interface (UNI); Network to Network Interface (NNI); and Private Network to Network Interface (PNNI). The backpressure mechanism disclosed in the referenced application employs two primitives, (1) a selective backpressure primitive which allows a node to control a single best effort connection, and (2) a global backpressure primitive which, in case of global congestion, allows a node to control an entire multiple-connection link without sending as many selective backpressure primitives as there are of best effort connections currently supported on that link.

A standard ATM cell routing label includes two complementary route identifiers: a virtual path identifier VP1 and a virtual channel identifier VC1. In an ATM network, a virtual channel connection is identified by a (VP1,VC1) combination. An ATM switch examines the both the VP1+VC1 fields in a label in order to establish an association between an incoming connection (VPlin, VClin) and an outgoing connection (VPlout, VClout). However it is possible for an ATM switch to route a whole set of virtual channels by analyzing only their VP1 identifier. All virtual channel connections with the same VP1 are then switched in a similar manner. Such a switch is called a VP switch and a network comprising VP switches is called a VP network. Such a switch (and network) is described by J. Y. Le Boudec in 'The Asynchronous Transfer Mode: a tutorial', Computer Networks and ISDN Systems, vol. 24, 1992, p. 279–309.

Implementation of a selective backpressure mechanism such as the one described in the referenced co-pending application is not possible in a VP network because the switching elements (VP switches or VP sub-networks) of said VP network ignore the VC1 identifier of the virtual connections. The VP switching elements thus cannot handle selective backpressure requests generated by the selective backpressure mechanism.

Figure 4:
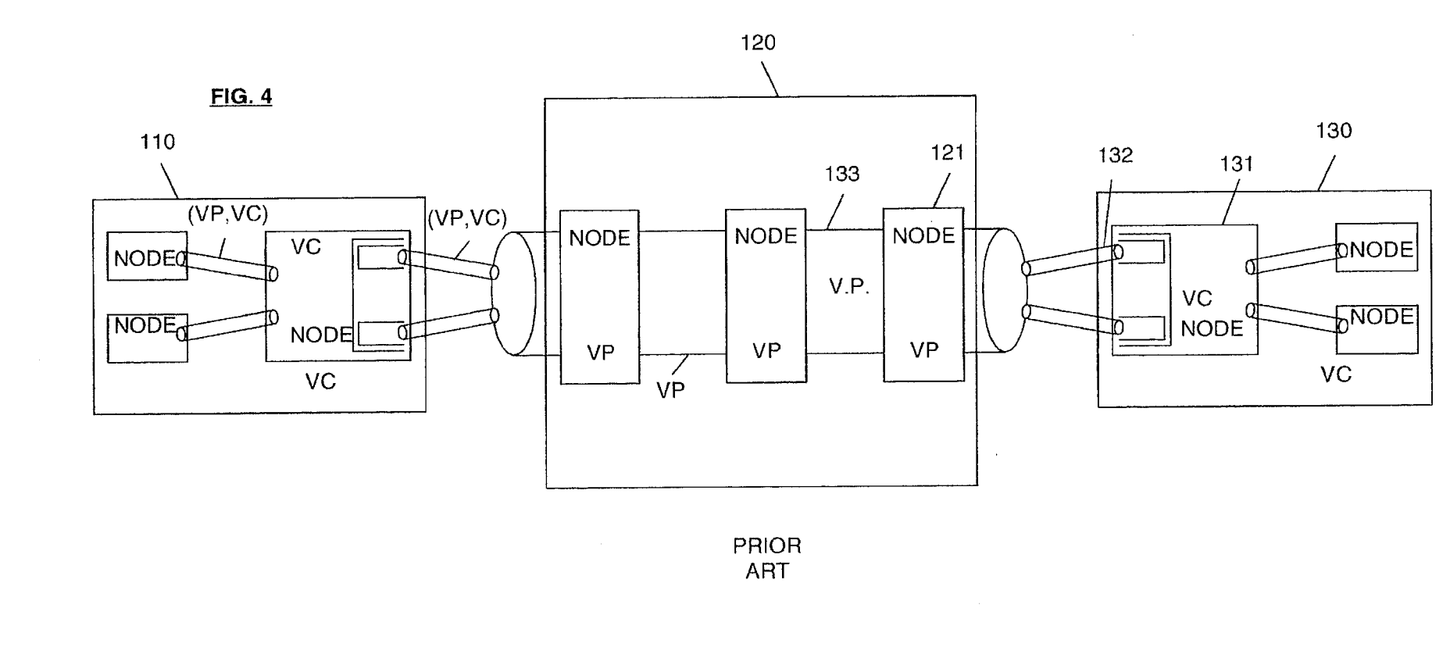
FIG. 4 is a diagram of a prior art ATM VP network connecting 2 ATM VC networks.

For example, in the network illustrated in FIG. 4, ATM virtual path network 120 connects ATM virtual circuit networks 110 and 130. If congestion occurs in node 131 due to the data traffic on connection 132, the flow control mechanism in node 131 tries to throttle the incoming data traffic by sending a selective backpressure signal to upstream node 121. If node 121 is a VP node, it does not recognize individual connection 132 and would not respond to the selective backpressure signal. The only way to prevent congestion is to generate a global backpressure signals which throttles traffic on all connections making up virtual path 133. The use of the global backpressure approach is incompatible with equitable flow control management.

Another drawback is that it is not possible to control the data traffic between virtual channels inside the VP network itself since virtual channels are not defined in said VP network.

SUMMARY OF THE INVENTION

An objective of the present invention is to provide a traffic control apparatus which can implement equitable traffic control in an ATM virtual path communication system. The communication system comprises a plurality of nodes interconnected by links. Each link comprises a plurality of virtual paths, each having a plurality of virtual channels. A connection between two nodes is defined as the combination of a physical link, a virtual path, and a virtual channel. Such connections are shared between a reserved bandwidth service and a best effort service. The best effort service is supported by both a per connection and a global backpressure mechanism, as described in the co-pending application. Instead of routing an ATM data cell by analyzing only its virtual path identifier, the traffic control apparatus routes the data cell according to its virtual cell connection identifier which is the combination of its virtual data path and virtual data channel identifiers. For this purpose, the traffic control apparatus comprises managing means for managing a pool of free queues for storing said ATM data cells, each of said queues storing incoming ATM data cells having the same virtual channel identifier.

More particularly, each of the virtual paths is defined by a virtual path identifier Vpi and includes a plurality of virtual channels, each of which is defined by a virtual channel identifier Vci, The links route incoming data cells conveyed by a virtual connection to downstream nodes, said cells being identified by a virtual path identifier CVPi, and a virtual channel identifier CVCi, with regard to said virtual path identifier CVPi.

The apparatus includes identifying means for identifying CVPi and CVCi parameters for each incoming data cell and is characterized in that it comprises managing means including: a pool of free queues for storing ATM data cells; means for allocating a queue from the pool of free queues to the virtual connection on which the incoming data cell is received if such a queue does not already exist and means for storing incoming data cells either in the newly-allocated queue or in a previously allocated queue associated with the virtual connection.

BRIEF DESCRIPTION OF THE DRAWINGS

Details of a preferred embodiment of the present invention will be more apparent from the following description with reference to the accompanying drawings wherein.

DETAILED DESCRIPTION OF THE PREFERRED EMBODIMENT

Figure 5:
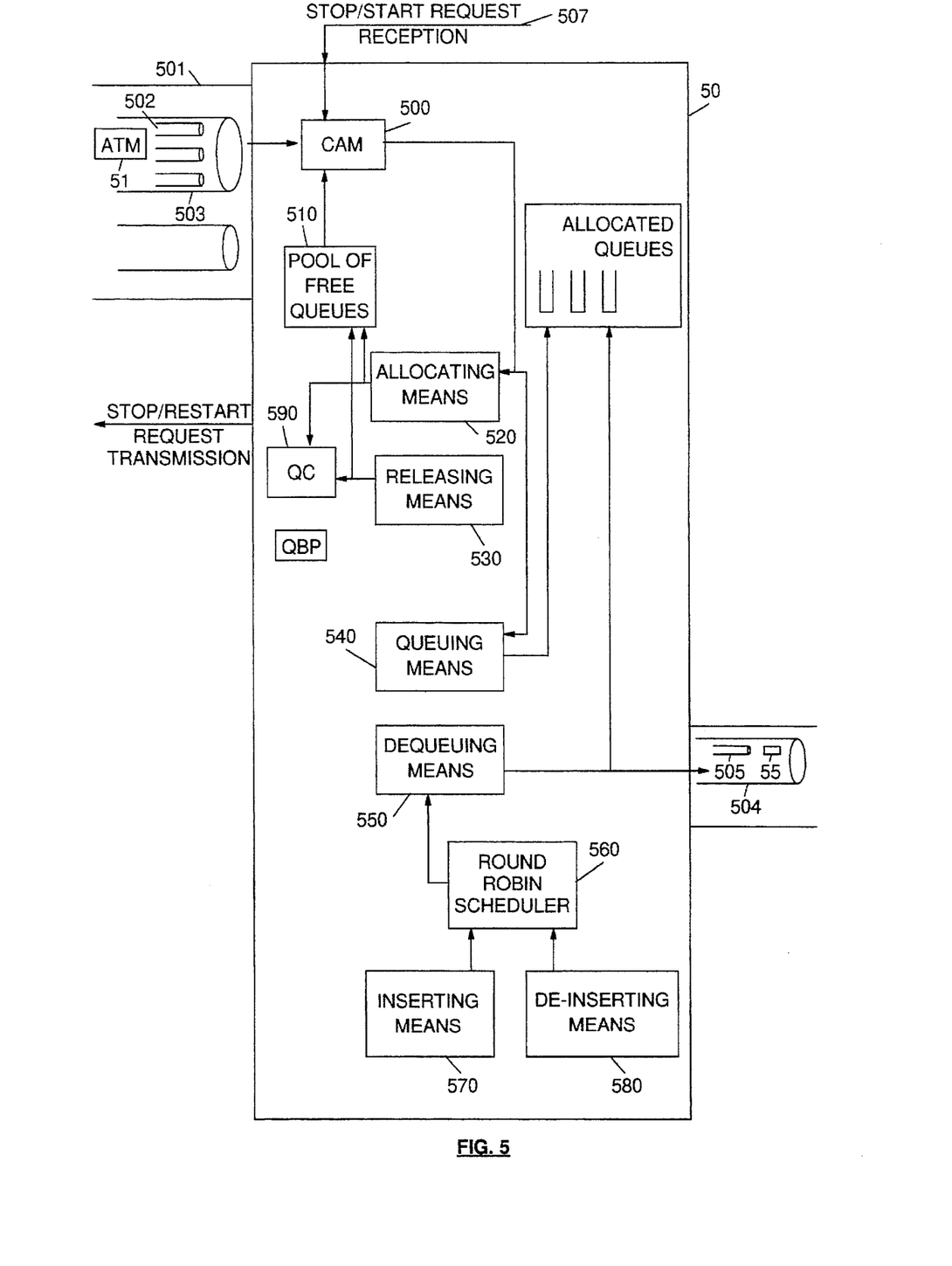
FIG. 5 depicts the an equitable queueing apparatus.

FIG. 5 is a view of an equitable queuing apparatus. An ATM cell 51 is conveyed on a virtual connection multiplexed on a physical link 501. The connection is identified by its ATM connection label; i.e., link identifier Lid, connection virtual path identifier VPi and connection virtual channel identifier VCi. The cell is identified by its ATM cell label: i.e., link identifier Lid, cell virtual path identifier CVPi and cell virtual channel identifier CVCi. The ATM cell label is identical to the ATM label of the connection on which the cell is conveyed.

Figure 6:
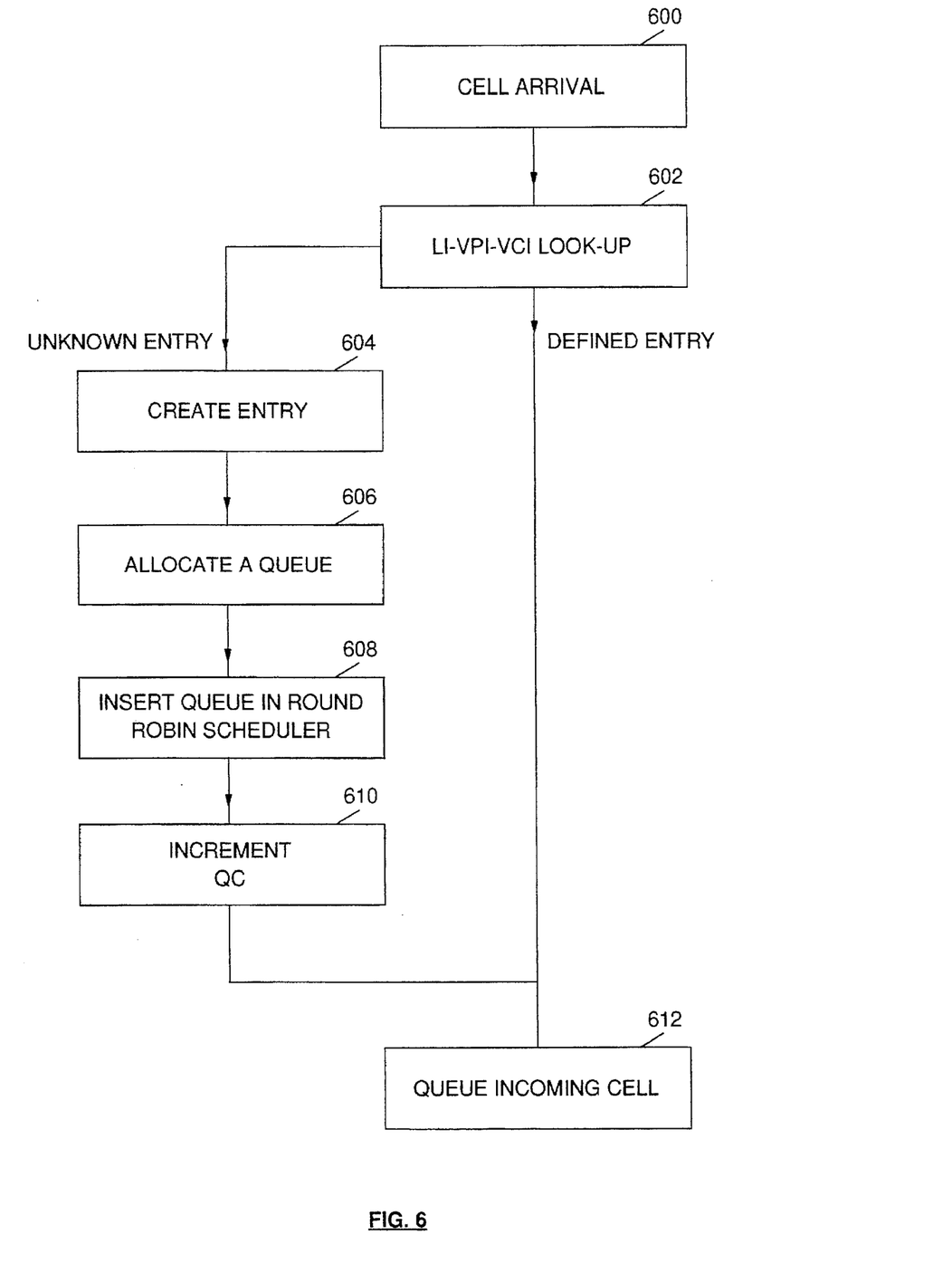
FIG. 6 is a flow chart of a dynamic queue allocating scheme.

FIG. 6 is a flow chart of a dynamic queue allocating scheme. The reception of an ATM cell 51 in the node 50 will be explained with reference to FIGS. 5 and 6. When an ATM cell 51 is received (step 600) by the node 50, a device 500 performs a look up operation using the identifiers contained in the cell label (step 602). In a preferred embodiment of this invention, the look-up system includes a content addressable memory. If the ATM label of the received cell is found in the content addressable memory, a queue corresponding to the cell label is already defined in the node The received cell is then stored in the queue corresponding to its ATM label (step 612). If an entry for the ATM label of the received cell is not found in the content addressable memory, there is no currently-defined queue corresponding to the label. A new entry corresponding to said ATM cell label is then created in the content addressable memory (step 604). A allocating means 520 allocates a queue from the pool of free queues 510 (step 606) by means of a dequeue operation in the pool of free queues 510. The new cell label entry is then associated with the allocated queue, which is inserted (step 608) by an inserting means 570 into the round robin scheduler 560. Counting means 590 increments a QC counter (step 610), which records the number of currently allocated queues.

Figure 7:
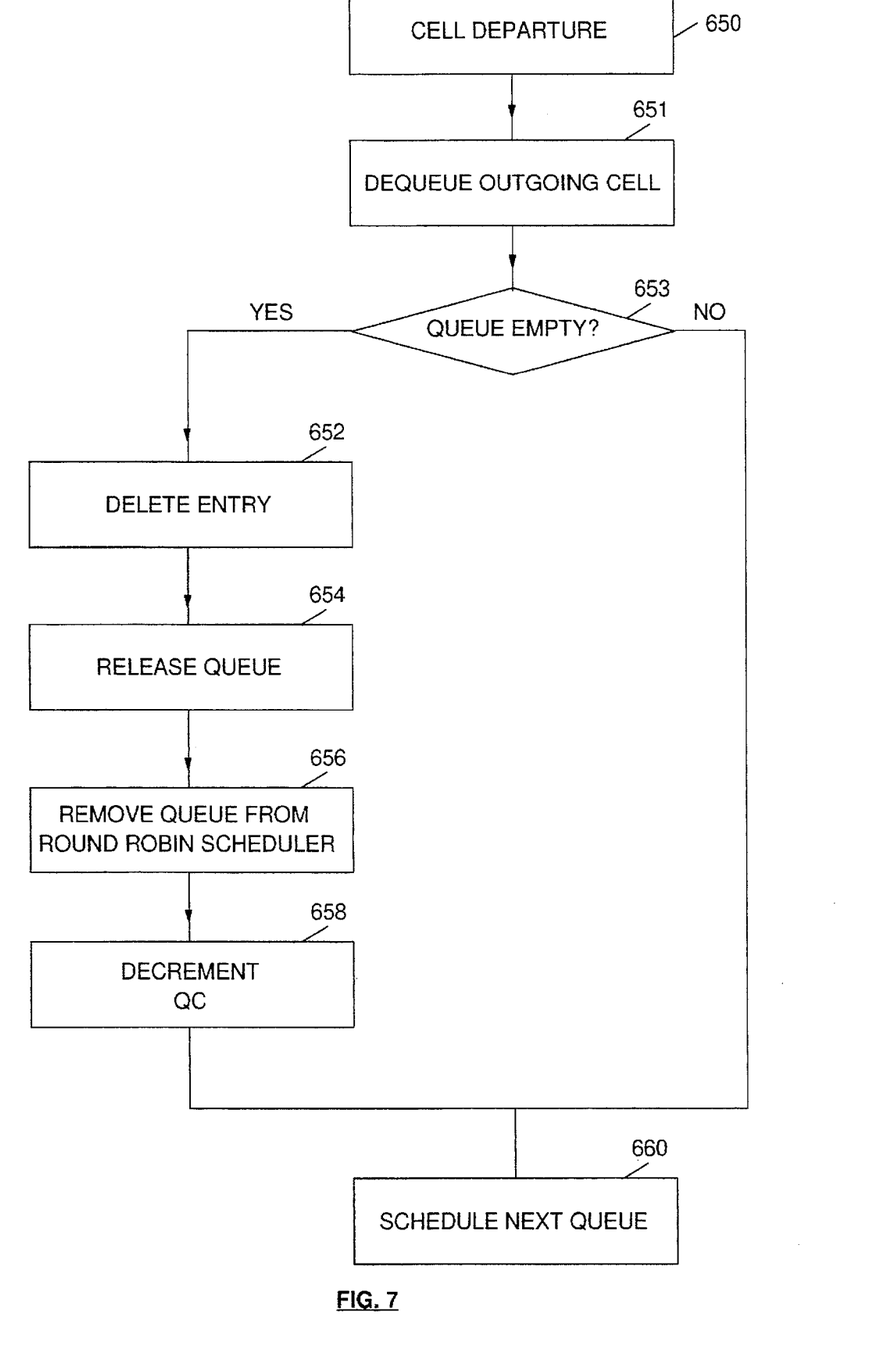
FIG. 7 is a flow chart of a dynamic queue releasing scheme.

FIG. 7 is a flow chart of a dynamic queue releasing or deallocating scheme. The transmission of an ATM cell 55 from the node 50 will now be explained with reference to FIGS. 5 and 7. A cell 55 scheduled, by the round robin scheduler 560, to be transmitted from the node 50 downstream in the network is dequeued from its connection queue (step 651). Cell 55 is then sent downstream in the network and the queue entry corresponding to the ATM label of the transmitted cell 55 in the content addressable memory 500 is deleted (step 652). If step 653 shows the queue is empty, the releasing means 530 releases the queue into the pool of free queues by means of an enqueue operation (step 656) in the pool of free queues 510. Counting means 590 decrements the count QC of allocated queues (step 658) and deallocating means 580 removes the queue from the round robin scheduler 560 (step 656). Finally, the round robin scheduler schedules the next queue (step 660) This is done whether or not the queue is empty.

Cell reception and cell transmission operation flows show that the queuing process is dynamically managed in a node on a cell-by-cell basis. A connection is defined (i.e. has an entry in the content addressable memory and a queue allocated) as long as there is at least one cell to be conveyed by said connection queued in said node. Moreover, the queuing scheme is fair as there is one queue per ATM connection.

Figure 8:
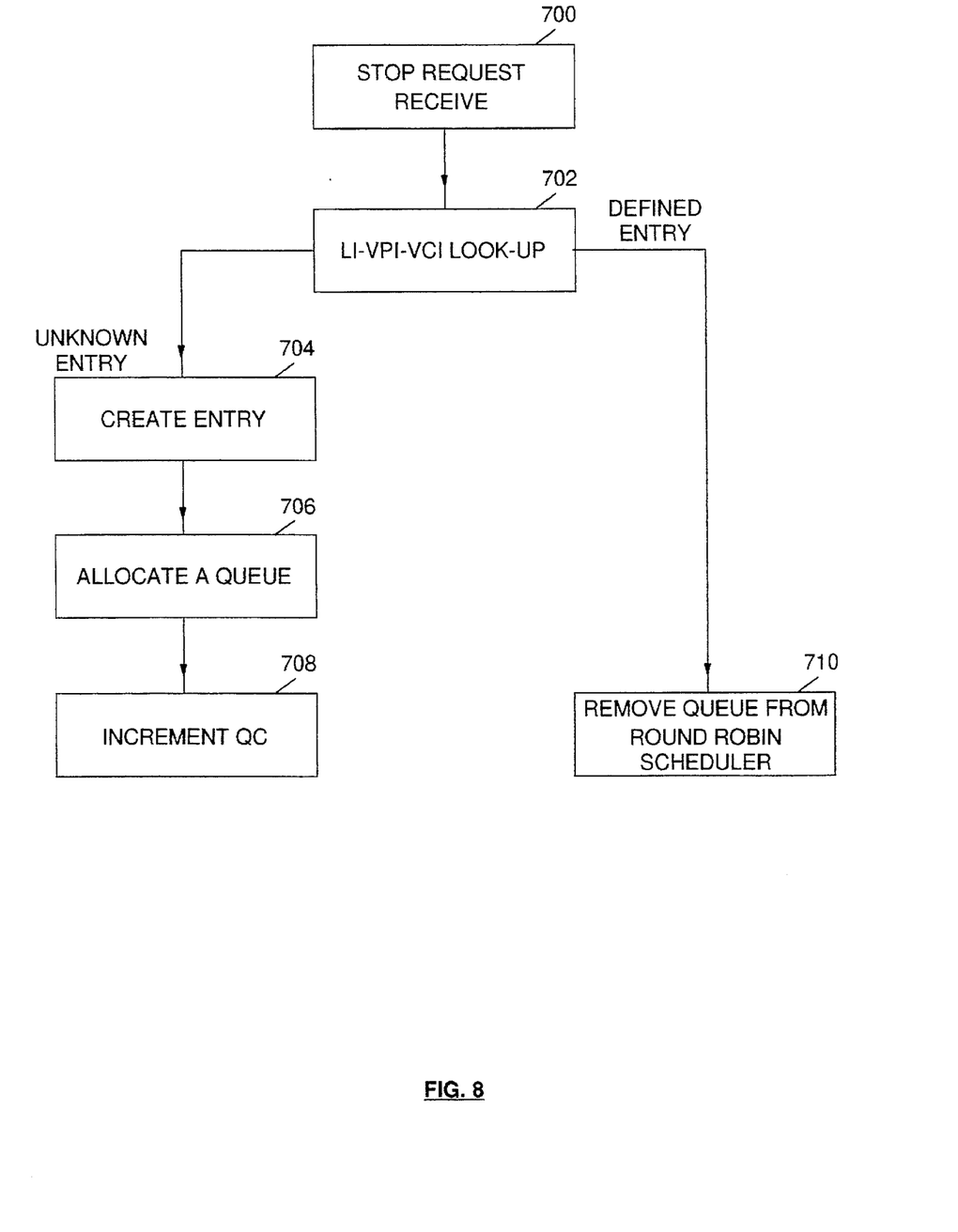
FIG. 8 is a flow chart of operations performed when a selective stop backpressure request is received at a node.

FIG. 8 is a flow chart of operations that are performed when a selective stop backpressure request is received at a node. When congestion occurs in a node located downstream from the node 50 due to the excessive traffic on one connection from node 50, the flow control mechanism operating in the downstream node may send a selective backpressure primitive to upstream node 50 in order to throttle the data traffic on the connection which is responsible for the congestion. The backpressure primitive includes the label of the connection to be throttled. When a selective stop backpressure primitive 507 arrives at node 50 (step 700), a device 500 performs a look up based on the ATM label in the backpressure primitive. The look up identifies (step 702) the connection that needs to be throttled. If the connection is identified through access to the content addressable memory 500, deallocating means 580 removes (in step 710) the queue corresponding to the connection from the round robin scheduler 560. This prevents the round robin scheduler from scheduling the queue for service and thus throttles the traffic that would otherwise be carried on the connection.

If the look up operation 702 yields negative results because the label does not have an associated connection-identifying entry in the content addressable memory 500, an entry corresponding to the connection is created in the content addressable memory (step 704) and allocating means 520 is caused to allocate a queue from the pool of free queues 510 (step 706) and the memory label entry is associated with the allocated queue. Counting means 590 increments the count QC of allocated queues in step 708.

Once the queue is allocated, incoming data cells which would normally be transferred to the throttled connection are stored in the allocated queue. However, since the queue is isolated from the round robin scheduler 560, it isn't served and incoming data cells are not transferred to the associated connection, effectively throttling the connection.

Figure 9:
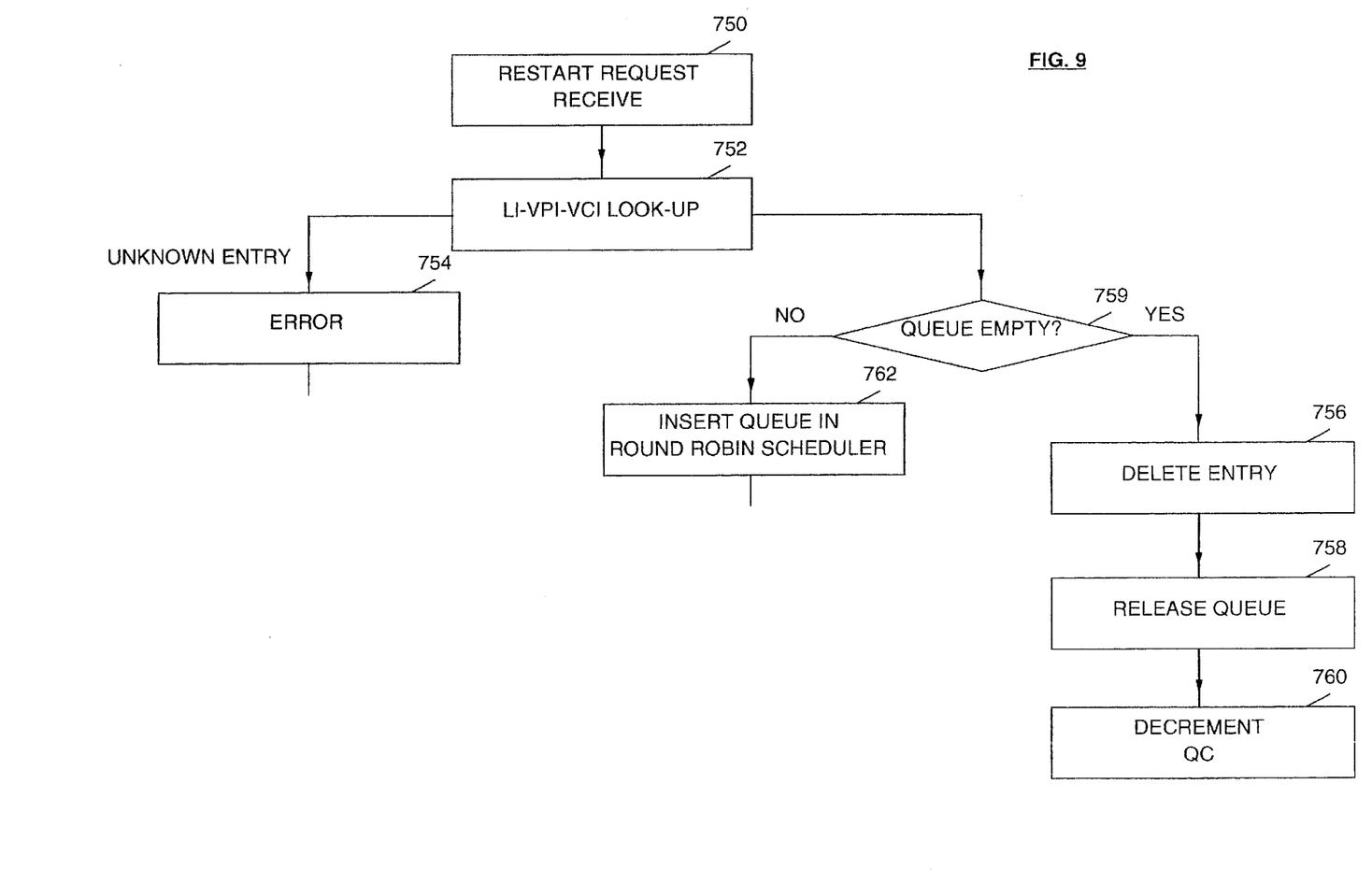
FIG. 9 is a flow chart of operations performed when a selective restart backpressure request is received at a node.

FIG. 9 is a flow chart of operations that are performed at a node when the node receives a selective restart backpressure request. In order to restart the traffic on a previously-throttled connection, a node located downstream to the node 50 sends a selective restart backpressure request containing the ATM label of the connection to be restarted. When node 50 receives this restart request, device 500 attempts to identify the connection (step 752) using a look up based on the ATM label contained in the request. The lack of a content addressable memory entry associating the ATM label to a particular connection is treated as an error (step 754) since any restart request should have been preceded by a stop request for which a connection entry should have existed or been defined. If such an error occurs, node 50 ignores the restart request.

If the content addressable memory does have a connection entry associated with the ATM label in the restart request, and if the queue associated with that connection is not found to be empty (step 759), the queue is inserted into the round robin scheduler (step 762), allowing queued cells to be transmitted the next time the connection is serviced. If the queue is found to be empty in step 759, the entry for the connection is purged from the content addressable memory 500 (step 756). The releasing means 530 causes the queue to be released into the pool of free queues (step 758) and counting means 590 decrements the allocated connection count QC in step 760.

Figure 10:
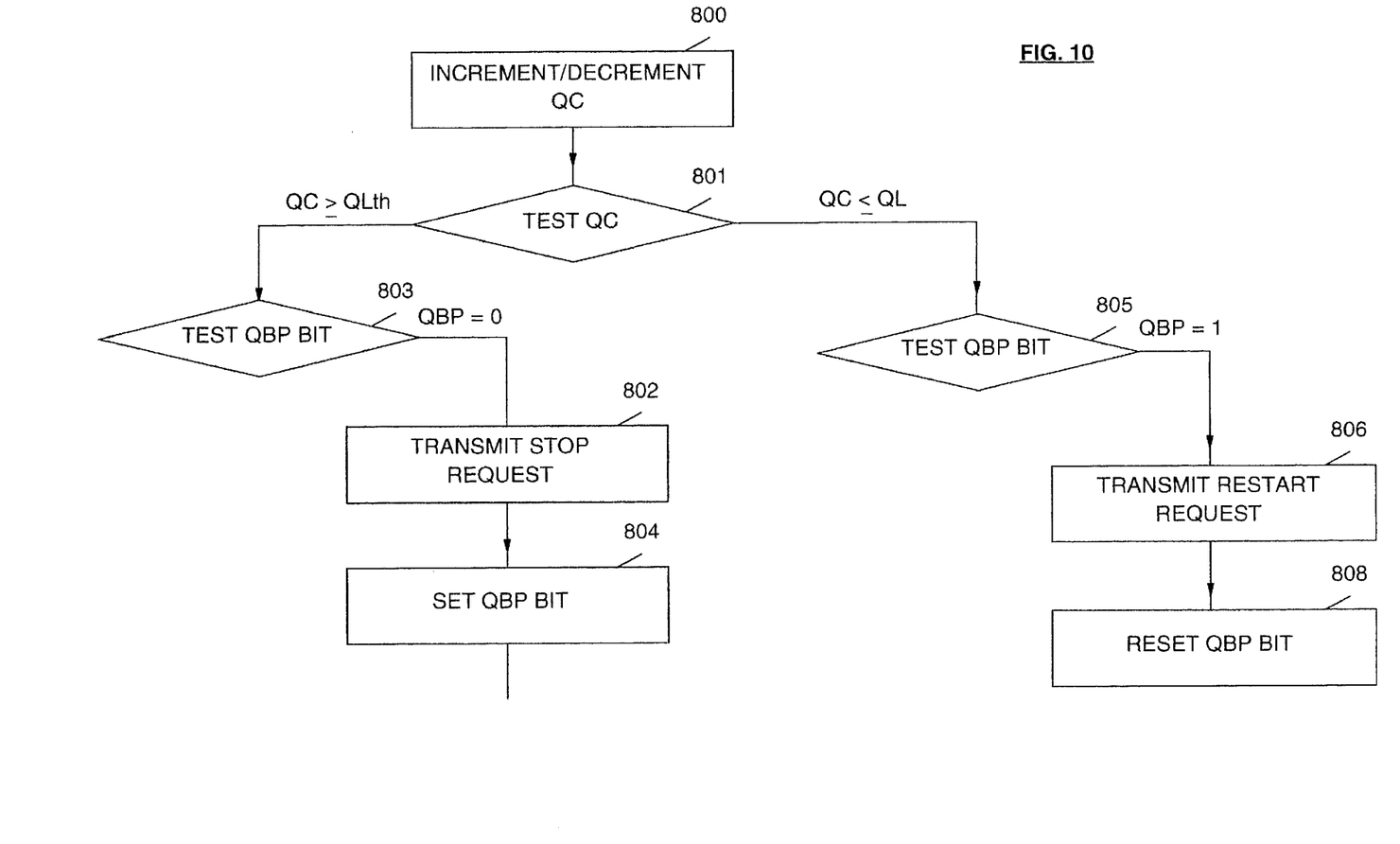
FIG. 10 is a flow chart of global stop/start backpressure request operations.

FIG. 10 is a flow chart of operations that are performed in generating global stop/start backpressure requests. In node 50, two thresholds are associated with counting means 590; a high threshold QLth and a low threshold QLtl with QLth>=Qltl. The high threshold QLtl is set so that the extra number of queues, in the pool of free queues, above said high threshold is greater than the aggregate round trip delay of the upstream hops of node 50. The round trip delay of an upstream hop of node 50 is defined as the number of cells which can be sent over the upstream hop to node 50 and queued in node 50 during the time it takes to send a stop signal to the upstream node and to store any cells which may have been launched onto the hop before the stop signal halted traffic at the upstream node.

When the QC value, representing the number of allocated queues and tested in step 801, becomes greater than the high threshold, QLth, the number of allocated queues begins to approach the maximum number of queues, QL, a node can allocate. Node 50 sends a stop request back to the upstream nodes in order to stop the traffic from entering the links (step 802) unless a test 803 of the QBP bit shows a stop signal is already active. Consequently, node 50 will have enough queues remaining in the pool of free queues, to handle the extra traffic received after said stop request has been sent, even if the content addressable memory in node 50 does not define a queue for the arriving cells and one must be allocated.

When sending the global stop request, node 50 sets the QBP bit to one (step 804) indicating that all the links entering the node are backpressured. When the value of count QC falls below the low threshold QLtl and the QBP bit is set, node 50 begins sending restart requests (step 806) to the upstream nodes in order to restart the traffic over the affected links provided a test 805 of the QBP bit shows a restart signal is not already active. Once the request has been sent, the QBP bit is reset in step 808.

Two points need to be considered when defining said thresholds QLth and QLtl of a node. The first point deals with the high threshold Qlth. In order to ensure a loss free operation, the Qlth threshold must be set up so that the extra queuing area above the threshold is greater than the aggregate round trip delay of the upstream hops connected to the node. That can be expressed as QLth<QL-sigma (round trip delay) where QL is the maximum number of queues a node can allocate.

The second point is that the low threshold QLtl which must be chosen high enough in order to ensure a no-underrun operation. The low global threshold QLtl must be set up so that the extra queuing area below the low global threshold is greater than the minimum round trip delay of the upstream hops to the node in question. This requirement can be expressed as: QLtl >Minimum(round trip delay). However, a low threshold too close to the high one, would lead to numerous threshold crossings which in turn would lead to excessive generation of flow control requests, which represent network overhead. In a preferred embodiment of this invention, the low threshold value is defined as half the high threshold value. That meets the no-underrun condition and is considered an acceptable tradeoff between traffic control overhead and traffic underrun.

While there has been described what is considered to be a preferred embodiment of the present invention, variations and modifications in that embodiment will occur to those skilled in the art once they understand the basic inventive concepts. Therefore, it is intended that the appended claims shall be construed to include both the preferred embodiment and all such variations and modifications as fall within the true spirit and scope of the invention.

What is claimed is:

1. In a data communication network having a plurality of nodes interconnected by links, each of said links being identified by a link identifier and supporting a plurality of virtual paths, each of the virtual paths being identified by a virtual path identifier VPi and further supporting a plurality of virtual channels, each of said channels being identified by a virtual channel identifier VCi, the combination of said link, virtual path and virtual channel identifiers defining a virtual connection over which data cells can be conveyed between nodes, each of said data cells including a virtual path identifier CVPi and a virtual channel identifier CVCi, a flow control apparatus located at a node in the network and comprising:

a pool of free queues for storing incoming data cells;

identifying means for reading the CVPi and CVCi identifiers for each incoming data cell;

means for performing a look up operation based on the CVPi and CVCi identifiers to determine whether a queue already exists for the virtual connection identified by said CVPi and CVCi identifiers;

means responsive to a determination that no queue exists for said virtual connection for allocating a queue from said pool of free queues and for storing cells received on said virtual connection in said allocated queue; and     means responsive to a determination that a queue already exists for said virtual connection to store cells received on said virtual connection in the already existing queue.

2. Flow control apparatus according to claim 1 further including:

a round robin scheduler for servicing all allocated queues;

inserting means for inserting a queue in said round robin scheduler, and     deallocating means for removing queues from said round robin scheduler.

3. Flow control apparatus according to claim 2 further including:

dequeuing means for transmitting a cell from a scheduled queue upon service by said round robin scheduler, and     means for releasing an allocated queue to said pool of free queues if said allocated queue becomes empty.

4. Flow control apparatus according to claim 3 further including means for stopping further transfer of data cells conveyed by a particular virtual connection in response to a first stop request from a downstream node.

5. Flow control apparatus according to claim 4 further including:

means responsive to a stop request and to a determination that a queue associated with the virtual connection does exist to remove that queue from the round robin scheduler, preventing further servicing of the queue; and     means responsive to a stop request and to a determination that no queue is associated with the virtual connection to allocate a queue from the pool of free queues while keeping the allocated queue isolated from the round robin scheduler.

6. Flow control apparatus according to any of claims 1 through 5 further including:

means for maintaining a count QC of the current number of queues allocated in said node, and     means for comparing the current count QC to a high threshold and to a low threshold, said high threshold being greater than said low threshold;

7. Flow control apparatus according to claim 6 further including means responsive to a determination that the current count QC has exceeded the high threshold to generate and send a stop signal to an upstream node provided such signal has not previously been sent.

8. Flow control apparatus according to claim 7 further including means responsive to a determination that the current count QC has fallen below the low threshold generate and send a restart signal provided such a signal was not previously generated.

\* \* \* \* \*